United States Patent [19]
Wood

[11] 4,169,531
[45] Oct. 2, 1979

[54] PLASTIC CONTAINER WITH INDIVIDUAL PRODUCT POCKETS

[75] Inventor: Clifford A. Wood, Pound Ridge, N.Y.

[73] Assignee: Packaging Components Industries, Inc., Roslyn Heights, N.Y.

[21] Appl. No.: 825,727

[22] Filed: Aug. 18, 1977

[51] Int. Cl.² .............................................. B65D 83/04
[52] U.S. Cl. .................................. 206/531; 206/532; 206/539; 220/339
[58] Field of Search ................. 206/44.12, 45.12, 531, 206/532, 538, 539; 220/339

[56] References Cited
U.S. PATENT DOCUMENTS

| | | | |
|---|---|---|---|
| 2,917,162 | 12/1959 | Horland | 206/538 |
| 3,111,220 | 11/1963 | Bostrom | 206/539 |
| 3,223,275 | 12/1965 | Rice, Jr. | 220/339 |
| 3,276,573 | 10/1966 | Kaufman et al. | 206/531 |
| 3,324,996 | 6/1967 | Jordt | 206/539 |
| 3,346,099 | 10/1967 | Thomas et al. | 206/539 |
| 3,504,788 | 4/1970 | Gray | 206/531 |
| 3,603,453 | 9/1971 | Serrell | 206/532 |
| 3,820,655 | 6/1974 | La Tourette et al. | 206/539 |
| 3,924,747 | 12/1975 | Gerner | 206/532 |
| 3,968,880 | 7/1976 | Ostrowsky | 220/339 |

Primary Examiner—Herbert F. Ross
Assistant Examiner—Bruce H. Bernstein
Attorney, Agent, or Firm—Roy C. Hopgood; John M. Calimafde; Charles W. Neill

[57] ABSTRACT

This package has a main panel with a plurality of sockets formed by displacing material of the panel in a direction to form sockets with closed ends within the package and the sockets opening through the bottom of the package. A thin and easily tearable film is adhered to the bottom of the package in position to close the lower ends of the sockets so that products do not fall out. The sockets can be collapsed by finger pressure against the upper ends of the sockets, and a pill pushed from a collapsed socket tears the film as it is pushed out. The package is made child-proof by adhering a strong film over the bottom of the thin film, and this strong tough film can be peeled off when a pill is to be removed from the package by an adult. A cover hinges over one end of the main panel and covers the closed ends of the sockets.

9 Claims, 8 Drawing Figures

PLASTIC CONTAINER WITH INDIVIDUAL PRODUCT POCKETS

BACKGROUND AND SUMMARY OF THE INVENTION

This invention provides a container or package with a plurality of individual sockets for holding products which are to be used in sequence. While it can be used for various small objects, it is primarily intended for use with pills.

The sockets can be numbered so that the pills will be used in a given sequence. The packages can be used for prescriptions where two different pills are used on alternate days.

Loading the sockets with an individual pill in each socket, a film is adhered over the open ends of the sockets so that each pill is protected from air and moisture; and, if appropriate, the package can be made of opaque material so as to prevent light from reaching pills that deteriorate when exposed to light.

The outstanding novelty of the invention is the unique construction of the package preferably from a single sheet of plastic material for all parts of the container except the films which close the bottom of the sockets after the sockets have been filled. A lid covers the closed ends of the sockets and provides space for printing information pertaining to the contents of the sockets.

For child-proofing the package, a layer of tough film is adhered over the film which holds the pills in the sockets; and this tough outer layer of film prevents pills from being pushed out of the sockets. However, the tough layer is adhered to the layer beneath it by an adhesive which permits the tough layer to be peeled back to expose the portion of the package below any socket from which the contents are to be discharged by pushing through the thin film. The tough film can then be replaced if the child-proof characteristic of the container is to be maintained.

The invention, in addition to providing for the individual pill packaging, protection from the environment and light, is an attractive and inexpensive container for the merchandising of pharmaceutical products.

The method by which the container is manufactured, filled and child-proofed, provides substantial economy in manufacture and results in a convenient and useful package.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
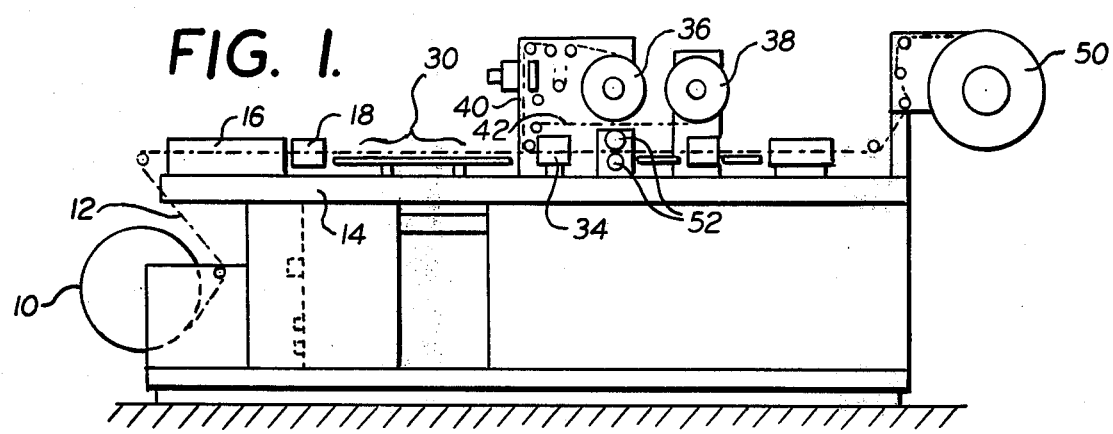
FIG. 1 is a diagrammatic view of apparatus for making the packages of this invention.

FIG. 1 is a diagrammatic illustration of apparatus by which the containers of this invention are made. A spool 10 supplies thermoplastic sheet material 12 to apparatus located on a support 14. The first unit on the support 14, through which the sheet 12 passes, is a preheating platen 16. The thermoplastic material 12 may be polyvinyl chloride, or other suitable thermoplastic material.

From the preheating station 16, the hot material 12 is formed, preferably by vacuum or compressed air forming with plug assist. The sheet material moves through the forming station with intermittent movement, each step being sufficient to bring a supply of plastic sheet into the forming station sufficient to make a complete container. The containers remain connected together in the sheet until they reach a subsequent punch-out station.

Figure 4:
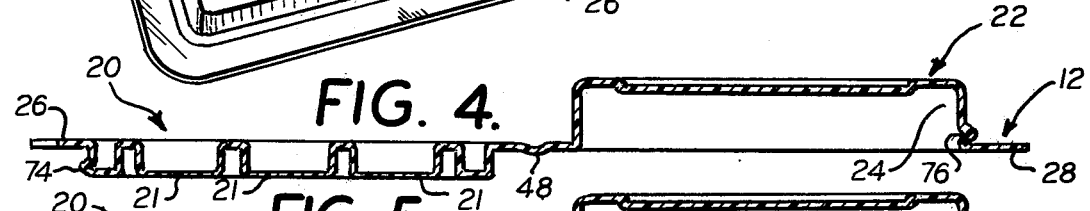
FIG. 4 is a sectional view on the line 4—4 of FIG. 3.
Figures 7, 8:
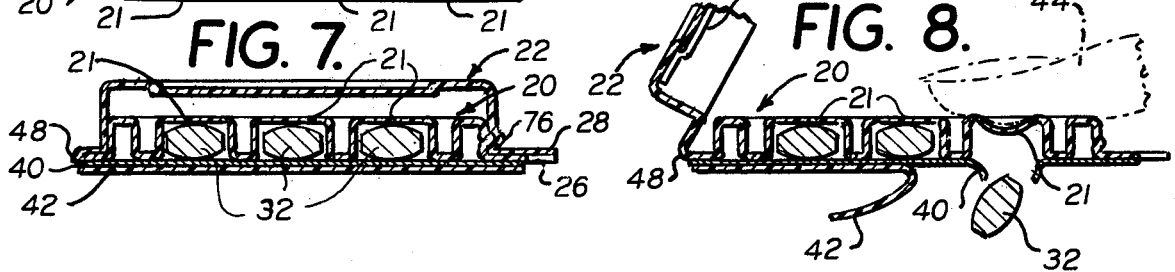
FIG. 7 shows the structure of FIG. 6 with the main panel swung 180° to close the container.
FIG. 8 is a view showing the way in which an individual pill is pushed from the container by partially collapsing one of the sockets in which the pills are contained.

As the material 12 travels beyond the forming station 18, it has the cross-section shown in FIG. 4, with a first part 20 having a plurality of sockets 21 closed at their lower ends and open at their upper ends, as illustrated. A second part 22 of the container is formed with a single socket 24 which is large enough to receive all of the sockets 21, as shown in FIG. 7.

Figure 3:
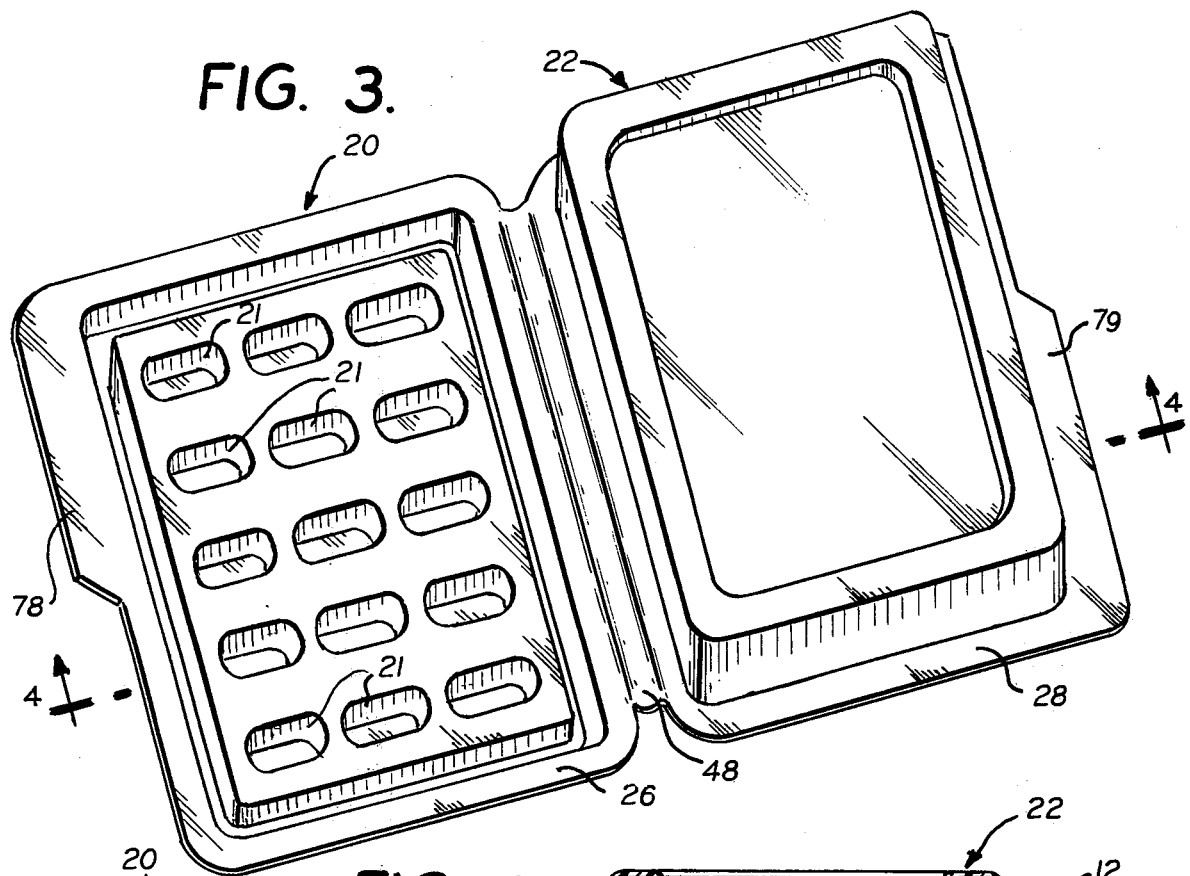
FIG. 3 is an isometric view of one of the containers of this invention, with the container open and without any products in the pockets which the sockets provide.

As the sheet 12 advances intermittently through the apparatus shown in FIG. 1, successive areas are given the cross-section shown in FIG. 4, and the parts of the plastic material which are not displaced at the forming station 18 provide material for rims or lips 26 and 28, shown in FIG. 3; but it will be understood that these rims or lips are part of the continuous unformed sheet material until the individual containers are severed from one another at a subsequent station.

Figure 5:
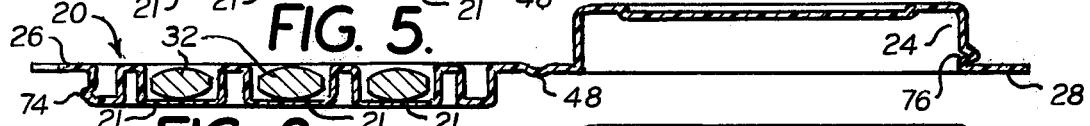
FIG. 5 is a view similar to FIG. 4 but showing pills located in the sockets of the main panel of the container.
Figure 6:
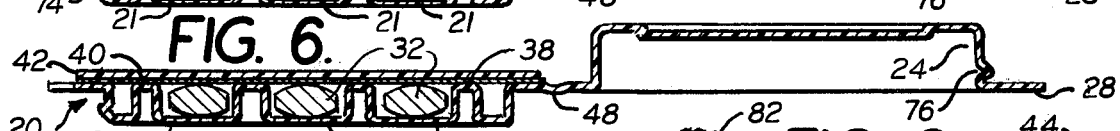
FIG. 6 is a view similar to FIG. 5 but with the films adhered to the side of the main panel through which the sockets open.

Referring again to FIG. 1, the formed containers, connected together, advance to a filling station 30 at which pills or other individual products are dropped into the respective sockets 21. FIG. 5 shows the sockets 21 with pills 32 in the sockets.

Referring again to FIG. 1, the connected container blanks, with the pills in the sockets, advance intermittently to a sealing station 34, where the open ends of the sockets are closed by superimposed films from reels 36 and 38. The first layer of film 40, which comes from reel 36, is applied directly over the ends of the sockets, and the reel 38 supplies an outer layer 42.

The inner layer 40 is made of paper or other material which is easily torn, so that when pressure is applied to the closed end of one of the sockets by a finger 44, as shown in FIG. 8, the pill in the socket can be displaced by being pushed through the thin layer of material 40, as illustrated. The pressure of the finger 44 partially collapses the socket 21 to the extent necessary to tear the layer 40 and push the pill 32 clear of the opening. The material 40 is firmly adhered to the portions of the first part 20 between the open ends of the sockets, so that the film or sheet 40 does not break loose from the container over any of the other sockets.

In order to child-proof the container, the outer layer of film 42 is made of polyethylene terephthalate or other tough material, so that as long as the outer layer 42 is secured over the inner layer 40, it is not possible to collapse a socket and push the pill 32 through the two layers 40 and 42. When an adult wishes to remove a pill from the container, the tough outer layer 42 is peeled back, as shown in FIG. 8, and the adhesive which secures the outer layer 42 to the inner layer 40 is preferably a pressure-sensitive adhesive which can be easily peeled back and again applied over the area from which it was peeled after a pill has been removed.

Referring again to FIG. 1, the connected-together packages advance to a punch-out station 46, where the individual packages, as shown in FIG. 3, are punched clear of the continuous sheet 12 from which they were formed to make a package unit such as shown in FIG. 3. The first part 20, in which the sockets 21 are formed, remains connected with the second part 22 by a hinge 48 which is of one-piece construction with the rest of the container.

Referring again to FIG. 1, the waste material from which the packages are punched wraps on a waste reel 50, which is rotated by power means not shown, and the material is advanced through the apparatus of FIG. 1 by power feed rolls 52 driven by motor means not shown.

Figure 2:
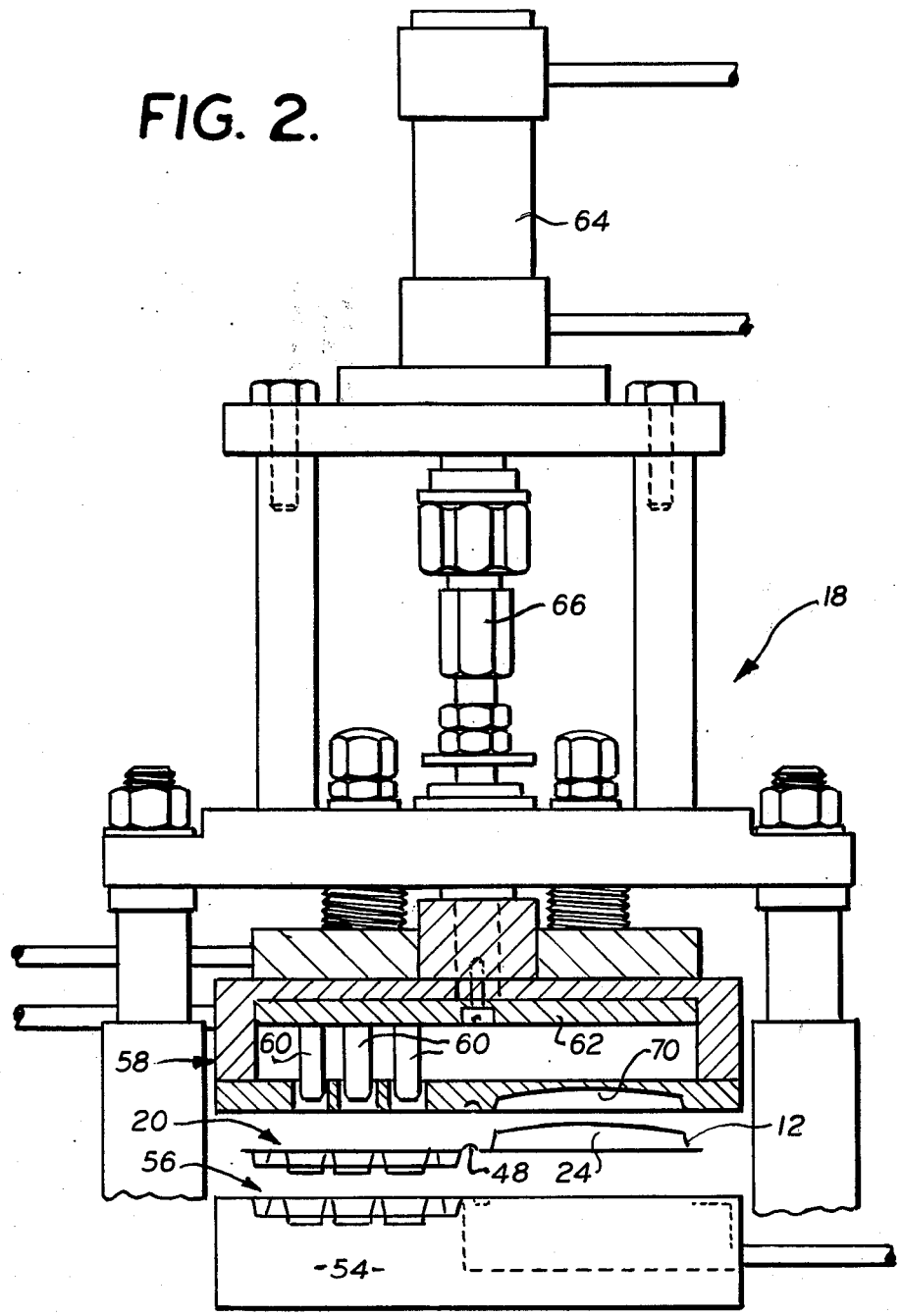
FIG. 2 is a greatly enlarged, schematic view, partly in section, of a portion of the apparatus shown in FIG. 1.

FIG. 2 shows the forming station 18. The material to be formed advances over a lower mold section 54 in which there is a lower mold cavity 56. An upper mold section 58 moves toward and from the lower mold section 54 to clamp the thermoplastic material 12 between the mold sections during a molding operation and to permit the thermoplastic material 12 to advance intermittently after each molding operation.

The cavity 6 has depressions therein for forming the sockets in the first part 20 of the container; and the material 12 is pressed into the cavity 56 by compressed air and/or vacuum-forming technique with an assist from plugs 60 attached to a header 62 which moves downward after the mold is closed. The opening and closing of the mold is performed by a cylinder 64 connected with the upper mold section 58 by motion-transmitting connections indicated by the reference character 66. The single socket 24 is formed by forcing the material 12 into a socket 70 in the upper mold section 58 by compressed air and/or vacuum forming technique. The hinge 48 is preferably formed at the same time.

The apparatus shown in FIGS. 1 and 2 is diagrammatic, and the mold parts are shaped to give the unfinished container the shape shown in FIG. 3. The hinge 48 is preferably reduced somewhat in thickness so as to provide more flexibility. A protuberance 74 is formed on the side of the first part 20 in position to latch into a depression 76 on the inside surface of the second part 22. The second part 22 fits snugly over the first part 20, as shown best in FIG. 7, when the container is closed. The rims or lips 26, and 28, best shown in FIG. 3, contact with one another when the container is closed, and these lips on the sides away from the hinge are of greater width along different parts of the package, so as to facilitate opening of the package. For example, the wider lip portion 78 of the first part 20 does not cover up the wider portion 79 of the second part 22. This provides exposed portions of the lips against which finger pressure can be applied to open the container.

If the second part 22, which forms the lid of the container, is transparent, a panel of paper or other material 82 can be applied to the inside surface of the cover with a picture or other decoration showing through the transparent top panel and with printing on the inside surface giving information about the contents of the package. If desired, printing can also be applied in position to be visible from the top of the package for indicating its contents. If the package is made of material which is not transparent, then printing or a label on the outside of the cover can be used to give the necessary information concerning the contents of the package or container.

Numbers can be applied to the closed ends of the sockets so that a person using the pills can record the numbers of the pills last taken and when they were taken and thus avoid confusion as to whether a pill was taken at the prescribed time. The numbers are also useful for indicating which end of the next line of sockets should be emptied first. When the sequence of pills includes alternating kinds of pills in successive sockets, and the number of sockets in each row is not an even number, it is essential that the patient know which socket to empty first when going from one row to the next.

The preferred embodiment of the invention has been illustrated and described, but different features can be used in other combinations without departing from the invention as defined in the claims.

What is claimed is:

1. A package for a plurality of products including in combination a first part made of flexible plastic material constituting a main panel with rows of sockets therein of one-piece construction with the rest of the main panel and with a mouth of each socket at the lower end thereof and opening through a bottom surface of the main panel and facing outward at the bottom of the package when the package is closed, each of the sockets being collapsible by finger pressure against an upper end thereof to dislodge a product in the socket out through the mouth of the collapsed socket, the main panel having an upstanding ridge that forms a side wall thereof beyond the area in which the sockets are located, the side wall having a rim extending outward from its lower end, a second part of the package made of flexible plastic material and of one-piece construction with said first part and constituting an integral cover that extends over the upper closed ends of all of the sockets when the cover is closed, and the cover having a clearance between it and the closed ends of the sockets for holding printed directions and other information relating to the products in the sockets and their use, and the cover having side walls extending downward to a level at which they overlap the upstanding ridge of the main panel above the rim thereof when the package is closed, a hinge connecting an edge of the cover to one edge of the main panel and of one-piece construction with the cover and main panel, said cover having a rim that contacts with the rim of the side wall of the main panel when the package is closed, the rims being connected together by the hinge, a punch-out panel covering the mouths of all of the sockets so as to hold the products in the sockets, said punch-out panel being connected to the lower surface of the main panel and extending across the mouths of the sockets and being weak enough to rupture under each pocket when pressure is applied to the upper end of a pocket to push the product in each socket through the punch-out panel to remove the product from the socket.

2. The package described in claim 1 characterized by a child-proofing panel covering the punch-out panel on the side of the punch-out panel opposite to the main panel, the child-proofing panel being too tough for products to be pushed through it by finger pressure applied to the products through the tops of the sockets.

3. The package described in claim 1 characterized by all parts of the package being made of plastic material that is of substantially the same thickness except at the sockets which are of thinner material than the rest of the package, and the rims being in substantially the same plane when the hinge is in its widest open position with both rims in substantially the same horizontal plane, and the main panel and cover being located so that one is above and the other is below said horizontal plane.

4. The package described in claim 1 characterized by the rim of the cover contacting with the rim of the main panel when the package is closed.

5. The package described in claim 4 characterized by portions of the rims extending across the front of the package with one of the rims extending further forward than the other rim across a portion of the width of the front of the package in position to be pushed away from the other rim to move the cover and main panel away from one another to open the package.

6. The package described in claim 1 characterized by projections and complementary depressions confronting one another on side walls of the cover and the ridge of the main panel in position to engage with one another to latch the package closed.

7. The package described in claim 6 characterized by some of the projections and complementary depressions being located near the hinge that joins the top of the package to the main panel for holding the cover closed in spite of resilience of the hinge which tends to move the rearward ends of the cover and main panel in directions to open the cover when the package is closed.

8. The package described in claim 1 characterized by the part of the main panel at the upper end of the sockets being transparent to expose to view the product in the package, the part of the cover above the sockets being of a nature to block passage of light.

9. The package described in claim 1 characterized by the cover being made of transparent, plastic material and having an inner layer of opaque material with a decorated surface on the underside of the cover and showing through the transparent cover, and printing on the underside of the opaque layer giving information about the package and its contents.

* * * * *